No. 879,149. PATENTED FEB. 18, 1908.
A. A. CUNNINGHAM.
DEVICE FOR PURIFYING PRODUCTS OF COMBUSTION AND OXIDATION.
APPLICATION FILED DEC. 15, 1906.
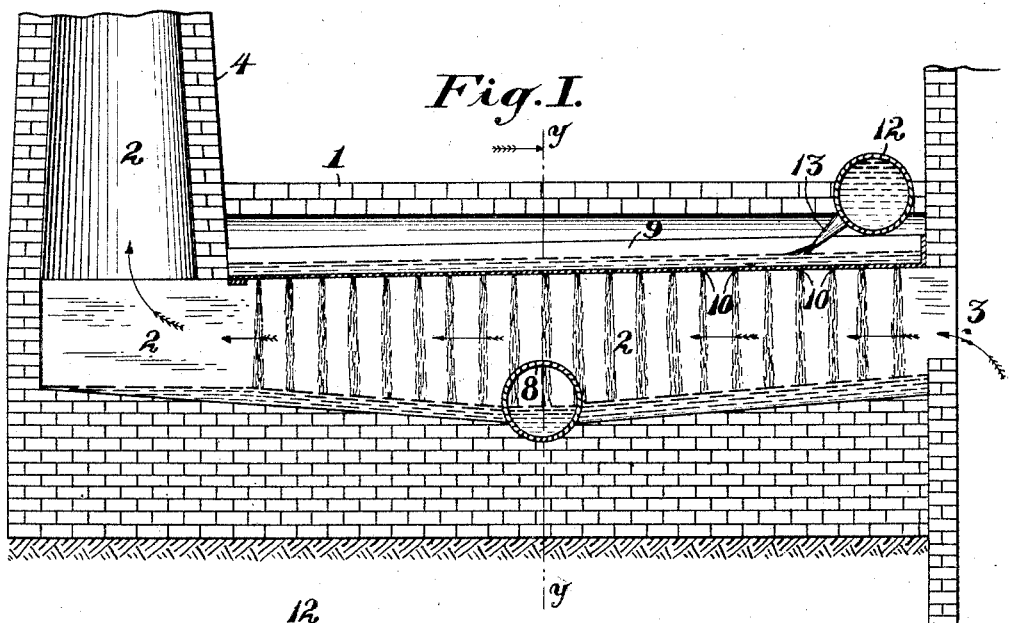
*Fig. I.*
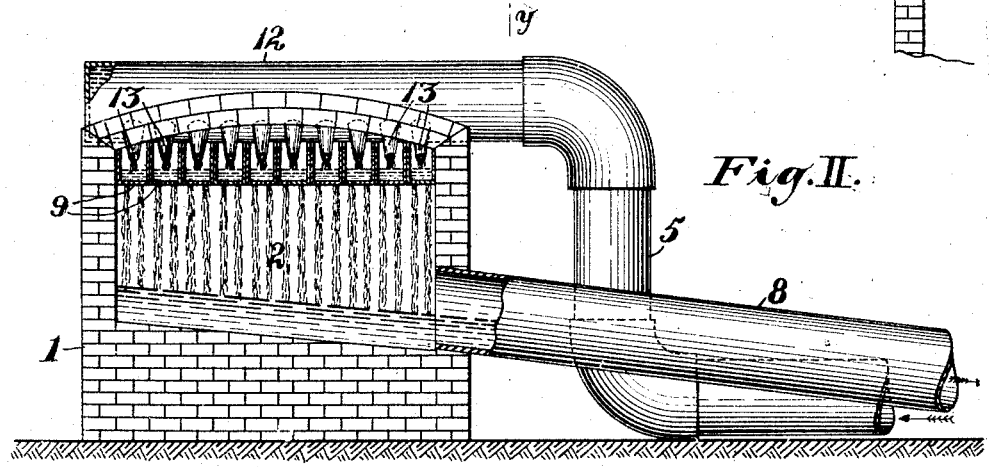
*Fig. II.*
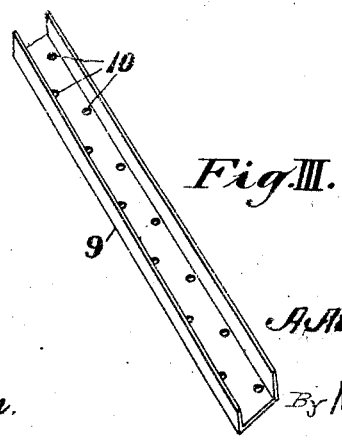
*Fig. III.*
WITNESSES:
F. C. Fliedner
Jno. L. McCathran.
INVENTORS.
A. Archie Cunningham
By Mason Fenwick & Lawrence
ATTORNEYS

UNITED STATES PATENT OFFICE.

ALEXANDER AUCHIE CUNNINGHAM, OF SAN FRANCISCO, CALIFORNIA, ASSIGNOR OF FORTY-FIVE ONE HUNDREDTHS TO ERIC MAXWELL FRANCIS, OF SAN FRANCISCO, CALIFORNIA.

DEVICE FOR PURIFYING PRODUCTS OF COMBUSTION AND OXIDATION.

No. 879,149.　　　Specification of Letters Patent.　　　Patented Feb. 18, 1908.

Application filed December 15, 1906. Serial No. 348,080.

*To all whom it may concern:*

Be it known that I, ALEXANDER AUCHIE CUNNINGHAM, a citizen of the United States, residing at San Francisco, in the county of San Francisco and State of California, have invented certain new and useful improvements in Devices for Purifying Products of Combustion; and I do hereby declare the following to be a full, clear, and exact description of the invention, such as will enable others skilled in the art to which it appertains to make and use the same.

The present invention relates to an improved device for the purification of the products of combustion and oxidation arising from furnaces, and while it may be employed in other connections, it will be found particularly useful when employed with the furnaces used for the smelting of ores, or for the incineration of garbage, manufacture of varnish and the like.

The primary object of the invention is to provide a simple and efficient means for removing from the waste gases and vapors of combustion and oxidation the solid particles, such as carbon, ashes and metallic salts, and the objectionable gases such as the exids of carbon, the sulfur compounds, and other vapors injurious to organic life.

With these and other objects in view, the invention comprises certain other novel constructions, combinations and arrangements of parts, as will be hereinafter described and claimed.

In the drawings:—Figure 1 is a longitudinal sectional view through a purification chamber constructed in accordance with the present invention. Fig. 2 is a transverse, sectional view on the line *y—y* of Fig. 1, looking in the direction of the arrow. Fig. 3 is a detail, perspective view of one of the distributing troughs.

Like characters of reference designate corresponding parts throughout the several views.

In the embodiment of the invention shown in the drawings the numeral 1 designates the inclosing walls of the purification chamber 2, which is preferably in the nature of a horizontal flue, and which is lined with refractory material adapted to resist the disintegrating action of the heat and chemicals. The entrance 3 to the purification chamber 2 is shown as located at one end of the said chamber, while the chimney 4 through which the products of combustion and oxidation escape to the atmosphere is located at the opposite end of the chamber. In the upper portion of the chamber 2 are disposed a series of distributing troughs 9, which are provided at suitable intervals throughout their length with discharge openings 10 and are so arranged as to have an inclined position. In the preferred form of the invention shown in the drawings the upper ends of the distributing troughs 10 are adjacent the entrance 3, while the lower ends of the troughs are in contact with a portion of the chimney 4 which extends a short distance within the purification chamber 2.

Water or other suitable liquid is supplied to the distributing troughs 9 through the medium of a supply pipe 5, the said pipe having a horizontal portion 12 which extends transversely across the upper ends of the distributing troughs 9. Projecting laterally from the portion 12 of the supply pipe and in communication therewith are a series of nozzles 13 which deliver the liquid into the troughs 9 from whence it is discharged through the openings 10 so as to fall through the purification chamber 2 in a number of streams which may have either a staggered or a parallel relation to each other, and which preferably have a sufficient body to prevent any objectionable deflection by the draft current.

The bottom of the purification chamber 2 is sloped in opposite direction to form a transversely disposed trough at an intermediate point thereof, the said trough being adapted to discharge into the waste pipe 8 by means of which the liquid is carried away from the purification chamber 2.

In the operation of the device it will be readily apparent that as the products of combustion and oxidation entering through the inlet 3 pass through the chamber 2, they are brought into repeated contact with the streams of water or other liquids, which thoroughly washes out all of the solid particles, and carries away the obnoxious substances in solution. In the practical construction of the device the discharge pipe 8 may be formed of any suitable material adapted to resist the action of the chemicals with which it is brought into contact, and the liquid after passing through the purification chamber may either be discharged into the sea or other large body of water or may be filtered by any approved means, such as passing out through broken slag or other like substances.

What I claim is:—

1. In a device of the character described, the combination of walls inclosing a purification chamber, means for causing the products of combustion and oxidation to pass through the purification chamber, a series of distributing troughs arranged in the upper portion of the chamber, and provided with discharge openings, a supply pipe extending transversely across the distributing troughs, and provided with means for supplying the various troughs with a liquid, and means for discharging the liquid from the bottom of the chamber.

2. In a device of the character described, the combination of walls inclosing a chamber, the bottom of which slopes in opposite directions to form an inclined channel leading to one side of the chamber, a discharge pipe communicating with the lower end of the channel, means for causing the products of combustion to pass through the chamber, a distributing trough located in the upper portion of the chamber and provided with a series of discharge openings, and means for delivering a liquid to the distributing trough.

In testimony whereof I affix my signature in presence of two witnesses.

ALEXANDER AUCHIE CUNNINGHAM.

Witnesses:
A. K. DAGGETT,
G. D. ROBERTSON.